United States Patent [19]

Soughan

[11] Patent Number: 5,337,537

[45] Date of Patent: Aug. 16, 1994

[54] GRANULABLE CONTAINER MEANS AND METHOD

[76] Inventor: John J. Soughan, 33 E. Orange St., Chagrin Falls, Ohio 44022

[21] Appl. No.: 997,502

[22] Filed: Dec. 28, 1992

[51] Int. Cl.⁵ .......................... B65B 3/02; B65B 5/02
[52] U.S. Cl. .......................... 53/452; 65/69; 65/114; 65/268; 53/471; 215/32
[58] Field of Search ............. 53/381.4, 452, 471, 53/492; 65/69, 114, 268; 215/32

[56] References Cited

U.S. PATENT DOCUMENTS

| | | | |
|---|---|---|---|
| 324,157 | 8/1885 | Pennycuick | 65/69 |
| 3,372,826 | 3/1968 | Heaton | 215/12 |
| 3,535,070 | 10/1970 | Francel et al. | 215/32 |
| 3,600,150 | 8/1971 | Rougeux | 65/268 |
| 3,613,930 | 10/1971 | Lippmann | 215/32 |
| 3,613,944 | 10/1971 | Zeigler . | |
| 3,683,815 | 8/1972 | Shaffer . | |
| 3,734,704 | 5/1973 | Fike | 65/69 |
| 3,776,707 | 12/1973 | Inoue et al. . | |
| 3,915,235 | 10/1975 | Hamilton et al. . | |
| 4,652,292 | 3/1987 | Ziegler et al. | 65/114 |
| 4,707,966 | 11/1987 | Weiler et al. | 53/452 |

OTHER PUBLICATIONS

Pfaender, Heinz G., "Schott Guide to Glass", Van Nostrand Reinhold Company, Inc., 1983, pp. 68-71.

*Primary Examiner*—W. Donald Bray
*Attorney, Agent, or Firm*—Pearne, Gordon, McCoy & Granger

[57] ABSTRACT

Glass bottles and other food containers or serving pieces are provided that are stronger and safer to use than present like articles, and that may easily and safely be caused to break into granules thereby reducing the bulk or volume of the used pieces. The granulation may be done at the point of consumption or use, thereby reducing storage space and bulk transportation costs. The granules are ecologically correct, innocuous as waste, and have a low litter profile.

1 Claim, 1 Drawing Sheet granulate

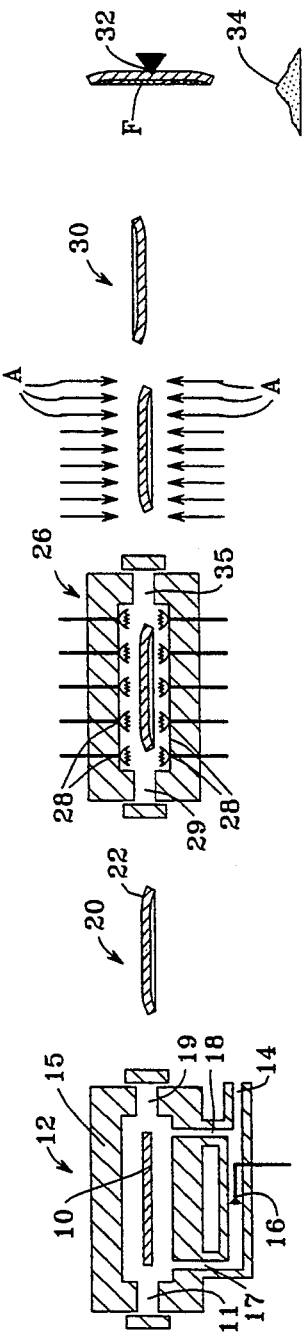

GRANULABLE CONTAINER MEANS AND METHOD

This invention relates to glass bottles, jars, and other glassware or molded or shaped pieces such as glass cups, bowls and plates, and to packaging or containment methods wherein manufacture, use and disposal of glassware for packaging or serving food are related in novel ways.

The invention is particularly applicable to, although not necessarily limited to, use of glassware such as bottles, jars, cups, bowls and plates used for liquid and solids containment and consumer service in the soft drink, beer, wine, bottled water, packaged foods, and fast food industries.

It was long a practice of the soft drink and beer industry to provide their product in reusable or, as referred to in the industry, returnable glass bottles. Such returnable bottles were ecologically desirable because they could be used several times or recycled, and were not disposed of after a single use. These bottles carried a deposit to insure return by the user. Users, however, gradually stopped returning deposit bottles because the value (deposit) was small and they perceived the time and bother not worth their effort. Increases in deposit did not change the situation and the deposit bottles continued to be thrown away after one use, just as higher-priced per-use cans and disposable glass containers were.

Consumer indifference was only one reason for the demise of deposit or returnable glass bottles. Retail establishments objected to returnable bottles because of the administrative cost of collecting, paying and accounting for the deposit. Since soft drinks and beer are among retail stores' highest volume sellers, the great number of empties returned created handling and storing costs for the retailers. Breakage, sanitation problems caused by residue in the returned bottles, paying out deposit money on lines they did not carry, etc., caused additional problems, and gradually the retail outlets refused to handle the returnables. There were costs to the bottler also in picking up the returnables, transportation, washing, storage and accounting for the deposit money.

To counter the can container, glass manufacturers introduced the disposable bottle, referred to as one-way, non-returnable or throw-away, and today it is the dominant glass package. The disposable bottle cost the consumer more per use than the returnable, but eliminated the costs and problems noted above for both the bottler and retail establishment. However, disposable glass bottles share some of the same problems of returnables, and have drawbacks of their own. Disposable bottles are not as strong or rugged as returnables. Like returnables, they break into shards and slivers of glass when they fail. Breaking bottles are more dangerous when the contents are under pressure as with soft drink and beer bottles. Accidents do occur in manufacturing, transportation, retail and the home.

The fact that bottles break into shards and slivers makes it unsafe, inconvenient and impractical for home users, restaurateurs, bartenders and the like to deliberately smash an empty bottle so as to reduce its bulk. There is an innate fear of the act of breaking glass, and of broken glass itself, so the bottle is placed intact in the trash container to be picked up, transported and disposed of by the municipality or its agent. High post-use handling cost, transportation cost, disposal cost and ecological damage have shifted from the glass manufacturer, bottler, distributor, retailer and consumer to the municipality (and eventually the community) responsible for the disposal of waste. Most of the bottles wind up in the dump or landfill. Some of them are crushed by heavy equipment, resulting in shards creating a safety hazard and litter problem. Some are eventually returned to the glass manufacturer as "produced" or purchased cullet, which must be carefully handled since it consists of sharp pieces of broken glass. (Cullet acts as a fluxing agent and promotes the melting of the sand. This conserves both energy and raw materials.)

Many efforts have been made to overcome the problem of broken glass beverage containers and the like, such as plastic coatings on glass, overwraps, etc., to both constrain and contain glass breakage. One drawback for beverage containers is that the use of both glass and plastic components makes later separation and classification difficult, thereby impeding both recycling and disposal.

Plastic bottles are superior to presently-used glass in that they are tough, light and strong, and do not break into shards. But they too have their drawbacks. The shelf life of the product is not as long as in glass containers. Certain materials may not tolerate plastic. Plastic bottles can be crushed by consumers but not really fully compacted.

Plastic bottles are fabricated of polymers or copolymers that are petroleum based. One can question the use of a depletable resource as the raw material for packaging products when glass packages can be made from inexpensive and virtually inexhaustible raw materials such as silicon, soda ash or sodium carbonate, and limestone or calcium carbonate. Polymer compounds perform usefully for containment. However, when sent to dumps or landfill, they resist decomposition indefinitely, thereby contributing to the ecological problem of waste disposal and pollution. Efforts to incinerate or otherwise chemically or thermally decompose such plastics involve problems of air pollution and may require costly processing if environmental damage is to be avoided. Many plastic bottle applications require virgin plastic, thereby adversely affecting and limiting recyclability.

In the fast food industry, paper and plastic cups, plates and containers are generally used to serve food to the consumer. The leavings of fast food customers, including dirty plates and cups, coated or mixed with food residues, are collected and disposed of as garbage. The paper and plastic components of this garbage are primary contributors to its bulk. Like soft drink and beer containers, such components of the garbage also resist decomposition, again contributing to the general problem of waste disposal and pollution.

More generally, glass has great advantages for food packaging due to its desirable functional properties and its non-contaminating nature. As a food container, glass is impermeable to gas, water vapor and other fluids and is inert to food contents. It is odorless, physically and chemically stable, resistant to acids and alkalis, transparent, easy to clean, and hygienic. Glass allows visual inspection of the contents and enhances the appetite appeal of the product. Glass is manufactured from very low cost materials, although melting the latter does require high energy input.

Despite these advantages, the use of glass containers for food packaging has been constrained by problems of bulk and safety, as discussed above. The magnitude of these problems is enormous. In 1990, over ten billion bottles were used by the beer and soft drink industries alone.

U.S. Pat. No. 3,613,930 to Lippmann proposes a "container or ampul" made of "tempered glass presently available on the market," and having a "narrow extension or tip" integrally joined to the body of the container. When the narrow extension or tip is broken, the container completely disintegrates, but whether into shards or granules is not stated. Disintegration into shards seems to be implied by the additional observation that the disintegration is "ordinarily not violent, so there is little danger from flying glass." In any case, the Lippmann container is unsuitable for food packaging or serving. Among other shortcomings, its narrow extension or tip precludes provision of a bottle neck or the like, and precludes any practical means of filling and capping. The extension or tip must be broken for access to the container contents, whereupon the container is destroyed and its contents are spilled or released. The contents of the container cannot be emptied, served or dispensed in a measured and deliberate manner.

U.S. Pat. No. 3,683,815 to Shaffer shows the use of a fragmentable glass container to contain tear gas. Shaffer explicitly discloses that his container "fragmentizes into particles which have no sharp edges, such as the safety glass in automobile windshields when broken." Like Lippmann's container, the Shaffer container is unsuitable for food packaging or serving. Again, the container shape is neckless and not adapted to filling and capping, and is generally not of a practical shape for the purposes of the present invention to be described below. Again, the container must be broken for access to its contents, whereupon the container is destroyed and its contents are spilled or released; the contents cannot be emptied, served or dispensed in a measured and deliberate manner.

In U.S. Pat. No. 3,613,944 to Zeigler, a glass spacer cylinder in an air bag control is fragmented by impact of a fragmentor pin. The characteristic of propagation of the fragmentation to points remote from the pin impact is evident in Zeigler, and is also explicitly exemplified in patents using bursting discs of fragmentable glass, such as U.S. Pat. No. 3,915,235 to Hamilton, wherein the disc is impacted at a radially outer portion to induce fragmentation that must extend through the radially central portion of the disc to effect opening of a passage blocked only by the radially central portion of the disc.

The disclosures of the foregoing references in respect of fragmentable glasses are hereby incorporated herein by reference as if fully repeated herein.

Like prior disclosures such as Shaffer, the present invention also uses glass which fragmentizes into particles which have no sharp edges. The present invention involves the concept of providing food-container and food-serving objects in the form of bottles, cups or plates or the like formed of such a glass—a glass stressed or treated by methods known in the glass art as "tempering" or "toughening" to provide a strong glass which, similarly to monolithic safety glass used for automobile windshields, when impacted or crushed breaks into many small almost regularly shaped pieces or granules having no sharp edges. These "granulable" glass articles can be serviceable as food containers or servers which may be lighter or stronger than comparable glass articles of the prior art. Following use, they can be impacted or locally crushed to cause granulation and provide a waste or residue that is compact or of low bulk, so that the residue or granulated remains of large numbers of bottles, plates or the like can be collected and concentrated in a small storage space by fast food restaurants, home consumers, and other users. This residue is easy, safe and inexpensive to handle and transport. It is non-contaminating in nature and can be used in landfill or even dumped at sea without ill effect, or can be efficiently and safely returned to a glass manufacturing site to be remelted and re-used as cullet.

The objects and advantages of the invention will be more fully understood from the following more specific description, taken together with the accompanying drawings, in which FIGS. 1A–1F are diagrammatic cross-sectional illustrations of various stages in the practice of an embodiment of the invention involving flatware such as plates. These drawings illustrate a cycle of manufacture, use and disposal of glassware for serving food, as contemplated by the invention. FIG 1A shows an air heating station. FIG. 1B shows the resulting shaped workpiece. FIG. 1C shows a temper heating station. FIG. 1D shows a quenching station. FIG. 1E shows a resulting stressed workpiece. FIG. 1F shows a workpiece being granulated. FIGS. 2A–2F are diagrammatic cross-sectional illustrations of various stages in the practice of an embodiment of the invention involving hollowware such as bottles. These latter drawings illustrate a cycle of manufacture, use and disposal of food containers such as soft drink and beer bottles, as contemplated by the invention. FIG. 2A shows a blow-molding station during re-heat. FIG. 2B shows the same station during final blow. FIG. 2C shows a temper heating station. FIG. 2D shows a quenching station. FIG. 2E shows a resulting stressed workpiece. FIG. 2F shows a workpiece being granulated. FIG. 2G shows a workpiece being granulated in an alternative manner. FIG. 2G shows a granulation step which is an alternative to that shown in FIG. 2F. FIG. 2H is an enlargement of part of FIG. 2G.

As is known in the manufacture of for example, automobile windshield safety glass, cut pieces of flat glass may be suspended or placed horizontally into processing equipment where they are quickly heated to about 150 deg. C above the glass transformation temperature. Immediately afterwards, the glass is blasted with cold air in an appropriately designed system of jets. As a result of this quenching process, the internal glass mass cools more slowly than the external surface, and it is still contracting after the surface has already solidified. Since the inner and outer layers are bound together, the outer surface layer is subject to compression and the inside to tension. This procedure is referred to as thermal or physical toughening of glass; the resulting glass is called tempered glass or monolithic safety glass.

The most important factors affecting the degree of prestressing are the thermal expansion of the glass above and below the transformation temperature, its modulus of elasticity, and the temperature difference above the transformation temperature which exists between the outer surface and the internal mass of the glass. The compressive stress obtained may be approximately three times that of the normal bending strength, and it increases with glass thickness. A bending load has therefore that much less effectiveness, resulting in increased bending strength.

Flat glasses include rolled, sheet, plate and float. These can all be prestressed, but usually float glass has been toughened for use in vehicles. Monolithic safety glass has been produced by large flat glass manufacturers which produce the flat glass itself.

Flat glasses, as well as molded bottle glasses, generally are soda lime glasses, consisting principally of soda, lime and sand. A typical soda-lime glass may be composed of 71–75 percent sand (silicon dioxide), 12–16 percent soda (sodium oxide as the raw material soda ash or sodium carbonate), 10–15 percent lime (calcium oxide for the raw material limestone or calcium carbonate), and the remaining materials for specific properties such as coloring. Sometimes magnesium replaces a portion of the calcium contained in the limestone, or potassium replaces the sodium in the soda.

The chemical and physical properties of soda-lime glass have lead to its wide use. Its light-transmission characteristics make it suitable as flat glass in windows. Another advantage is its smooth, nonporous surface which allows bottles and the like made from it to be easily cleaned. Soda-lime glass containers filled with drinks or foods do not affect the taste of the contents, nor do they contain any harmful substances. They will withstand repeated boiling (as in preserving jar use) without undesirable surface changes. The relatively high alkali content of soda-lime glass lowers the melting point as compared to pure silicon dioxide glass but also increases the thermal expansion coefficient.

During manufacture of monolithic safety glass for windshields and the like, the glass is bent, since windshields are curved. Bending (shaping) must precede tempering because the tempered condition would disappear at bending temperature.

As indicated above, such thermally toughened glass has been made and used as windshield safety glass. When such glass is impacted, e.g., when a windshield is hit by a stone while driving, or if a car is involved in an accident, the compressively stressed surface layer of the glass is broken, and the monolithic glass windshield thereupon breaks into many small, almost regularly-shaped pieces of glass having no sharp edges.

The present invention contemplates the cutting and bending or shaping of flat glass, preferably soda-lime glass, in a similar sequence as that described above, but using smaller workpieces cut and bent to form shaped flatware, for example food serving plates. As shown in FIG. 1, in one example of manufacture according to the invention, a workpiece 10 of flat glass cut in circular shape may be admitted through inlet 11 to the heating chamber 15 of air heating furnace 12. In a known manner, the workpiece may be supported by a hanger or suspending member (not shown). In a known manner, air from an intake 14 may be heated by means of burner 16 and fed to the heating chamber 15 of the furnace 12 via passage 17. Part of the air in the heating chamber 15 may be returned via the passage 18 and again heated by the burner 16 and recirculated to the heating chamber 15. In this way, and with suitable controls (not shown) the temperature of the workpiece in the heating chamber may be closely controlled in a well known manner. Examples of other suitable oven arrangements used in connection with manufacture of tempered glass sheet product are seen in U.S. Pat. No. 3,776,707 to Inoue, the disclosure of which is adapted by reference as if fully repeated herein.

When the workpiece is heated to forming temperature, it is emptied though outlet 19 and passed immediately to a forming station at which forming blocks or other means (not shown) engage the workpiece, or the workpiece is supported in such a manner as to allow its edge to sag. As the result of the shaping, a gentle curve is formed around the workpiece edge to produce (in upright or inverted position) a shallowly-flanged disc, or flat-bottomed, dish-shaped object. In the example shown in the drawings, the workpiece 10 becomes an inverted dish-shaped glass object 20 consisting of a flat central portion surrounded by a shallowly-angled circular flange 22, as seen in FIG. 1B.

The shaped workpiece 20 may then be admitted through inlet 24 of tempering heating furnace 26 (FIG. 1C). This furnace may include a plurality of burners 28 extending through the furnace walls. In the furnace 26, the glass is quickly heated to a temperature suitable for tempering, say to about 150 deg. C. above the transformation temperature of the glass. The heated workpiece is then emptied through furnace outlet 25 and immediately positioned at a quenching station (FIG. 1D) where it is blasted with cold air, as indicated by the arrows A in FIG. 1D, directed by an appropriately designed system of jets (not shown). As a result of the quenching process, the internal glass mass cools more slowly than the external surface, and it is still contracting after the surface has already solidified, in a manner similar to prior practice in the manufacture of monolithic safety glass for shaped car windshields, referred to above.

The result is the plate-shaped object 30 consisting of internally stressed monolithic safety glass, with compressively stressed outer layers and an inner layer or core stressed in tension. It may be used for example in fast food restaurants or in hospitals, nursing homes or other institutions to provide a hard-surfaced, sanitary and strong piece of dishware having great appeal to customers, patients or other consumers, as compared to paper or plastic plates.

Following use, plates 30 may be disposed of on-site by impact or crushing sufficient to initiate granulation of the tempered glass. Such forces may be referred to as initiator impact or crushing forces. In the particular example illustrated, each used plate is impacted by a fragmentor pin 32 having a relatively sharp point or edge which is impacted against the plate with sufficient force to break the surface layer or compressively stressed outer layer of the plate 30, whereby the compressively stressed surface layer of the glass is broken, fracturing of the monolithic glass propagates throughout the plate as symbolically indicated by the hatching F in FIG. 1F, and the monolithic glass plate thereupon breaks into many small, almost regularly-shaped pieces of glass having no sharp edges. The breaking-up of the plate contributes a portion of blunt-edged glass granules to a pile 34 of the same. The pile 34 may be contained in suitable bins or the like (not shown) for ready collection and disposition without further treatment.

If the glass is to be recycled, the plates 30 may be rinsed prior to being granulated, or the granules 34 may be washed or separated from food residues by flushing, flotation techniques or other means at the point of consumption or use, or elsewhere, to produce clean granules for recycling.

The fragmentor pin 32 or equivalent can be similar to fragmentor pins of the prior art used in connection with tear gas grenades, air bags, or bursting-disc valves, or can involve any other suitable arrangement. The impactor can be hand operated or power operated. Impacting can be accomplished by moving the pin against a stationary plate, moving the plate against a stationary pin, or moving each relatively against the other. A simple example of impacting would be the disposition of a plate by simply holding it over a suitable storage bin and striking it a single sharp blow with a hammer.

Instead of impacting as with the fragmentor pin 32 or other impactor means, the plates 30 can be granulated by local crushing sufficient to break the compressively stressed surface layer, initiate proliferation of fragmenting, and thereby cause granulation of the monolithic glass plate. Such local crushing can be carried out, for example, in the manner described below in connection with granulable glass bottles (see discussion below with reference to FIG. 2G).

In connection with known uses of thermally toughened glass as windshield safety glass, as mentioned above, it is further known that the size of the particles of glass can be controlled in advance by modifying the toughening procedure. This can be important for automotive windshields in order that the driver not be totally deprived of forward vision. Accordingly, monolithic safety glass for windshields has been equipped with so-called vision islands which crack into larger pieces than the remainder of the glass. These provide reasonably good vision until the damaged windshield can be replaced.

In the present invention, optionally the toughening procedure may be similarly modified, to give granules of glass of various sizes (including both relatively tiny granules and relatively large smooth-edged chunks of glass) when the plates 30 are granulated. Where there is no concern whether particle sizes are or are not uniform, manufacturing tolerances can be correspondingly relaxed. In many circumstances, there may be no great disadvantage if there is considerable variance in particle size when a given plate 30 is granulated, or considerable variance in particle size from plate to plate when a number of plates are granulated.

A particular application of the invention is in the manufacture, use and disposition or recycling of glass bottles for packaging soft drinks and beer, an example of which is illustrated in FIGS. 2A–2G. The manufacture of bottles may begin with conventional steps for automatic blow-molding of bottles, preferably of soda-lime glass, wherein a stream of glass flowing from a forhearth (not shown) is cut by shears into individual gobs which, are fed to a blank mold (not shown). In the blank mold, the gob is formed into a rough blank or parison by either a plunger or compressed air. Here the upper neck or opening of the bottle may get its final shape, in accordance with known practice. The blank mold opens and the parison 40, supported by the bottle opening, is transferred to the final or blow mold 42 seen in FIG. 2A. Here it is reheated and then in a final blow (FIG. 2B) the parison is expanded to the final molded bottle shape 44. All the foregoing manipulative steps in glass bottle manufacture are known.

According to the present invention, after the mold 42 is opened and the workpiece taken out, it may be transferred to a tempering heating furnace 50 (FIG. 2C) which may include a plurality of burners 52 extending through the furnace walls. While for convenience of schematic illustration, inlet and outlet openings for the furnace 50 are shown at its top and bottom ends, such openings will preferably be at opposite end walls of the furnace for better heat control and stability, it being understood that the burners 52 extend through the furnace sidewalls, rather than the endwalls.

In the tempering heating furnace 50, the glass of the molded bottle is quickly heated to a temperature suitable for tempering, say to about 150 deg. C. above the transformation temperature of the glass. The heated workpiece is then emptied through the furnace outlet and immediately positioned at a quenching station (FIG. 2D) where it is blasted with cold or treated air, or other coolant, as indicated by the arrows A in FIG. 2D, directed by an appropriately designed system of jets not shown for the most part, but which include a blast probe 54 adapted for quick insertion through the bottle neck. Preferably, means is provided to maximize and equalize heat removal from the interior faces of the endwall and sidewalls of the bottle despite the restrictions to ingress and egress presented by the relatively narrow bottle neck. Such maximizing means may include, for example, balancing the arrangement of jets along the length of the probe 54 to favor the lower interior bottle portions to a degree reflecting the higher mass flows and/or higher wiping velocities experienced at the portions of the bottle interior that are higher or that are both higher and narrower, but not to a degree that fails to take into account the rapid heating of the air upon initial contact with the glass (so that incoming air admitted to the lower portions of the bottle rapidly becomes less "coolworthy" as it passes toward the top). A constraint is the degree to which incoming and outgoing streams of air can be thermally isolated from each other by adequate thermal insulation within the confined dimensions of the neck, and the attainable degree of such insulation should be taken into account.

Equalization of heat removal may also be promoted by molding the bottle shape to provide optimum heat-flow distribution.

The result of a successful quenching process is the "granulable" bottle 60 seen in FIG. 2E. The bottle is tough and strong, and although molded, consists of an internally stressed or tempered glass similar to monolithic safety glass. The tempering strengthens the glass. The bottle 60 may be filled and capped to be used as a soft drink or beer container. It is particularly to be noted that the mechanical stresses that the bottle experiences during filling and capping do not equal those imposed by initiator impacts or forces, and the bottles remain intact. The bottles are then used to store their contents until, in the hands of the consumer or person dispensing the contents, the bottles are opened and their contents emptied.

Following use, bottles 60 may be disposed of in the same ways as previously described for the plates 30, by imposing an initiator impact or crushing force. In the particular example illustrated, each bottle 60 is impacted by a fragmentor pin 32 which is impacted against the bottle with sufficient force to break the surface layer or compressively stressed outer layer of the bottle, whereby the compressively stressed surface layer of the glass is broken, fracturing of the monolithic glass propagates throughout the bottle as symbolically indicated by the hatching F in FIG. 2F, and the monolithic glass bottle thereupon breaks into many small, almost regularly-shaped pieces of glass having no sharp edges. The breaking-up of the bottle contributes an additional portion of blunt-edged glass granules to a pile 64 of the same. The pile 64 may be contained in suitable bins or the like (not shown) for ready collection and disposition without further treatment.

Since the bottle contents were liquids such as soft drink or beer, there will ordinarily be little contamination of the glass by the former contents of the bottles. If desired, the granules 64 may be given a water wash or otherwise treated.

Again similarly to the plates 30, the fragmentor pin 32 or equivalent can be similar to fragmentor pins of the prior art used in connection with tear gas grenades, air bags, or bursting-disc valves, or can involve any other suitable arrangement. The impactor can be hand operated or power operated. Impacting can be accomplished by moving the pin against a stationary bottle, moving the bottle against a stationary pin, or moving each relatively against the other. A simple example of impacting would be the disposition of a bottle by simply holding it over a suitable storage bin and striking it a single sharp blow with a hammer.

Again, as mentioned in connection with the plates 30, instead of impacting as with the fragmentor pins 30 or the like, the bottles 60 can be granulated by local crushing sufficient to break the compressively stressed surface layer and thereby cause granulation of the monolithic glass. For example, a bottle may be delivered to the crushing station seen in FIG. 2G via a chute 61. A retainer cage at the bottom of the chute includes transverse members 62 which retain the bottle at the end of the chute. As shown in FIG. 2G, a lever with a crushing nose 63 is pivotally mounted in the chute side wall and is movable from the dashed-line position shown in the drawing to the solid-line position, thereby exerting a local crushing force against the bottle sufficient to break the surface layer or compressively stressed outer layer of the bottle, whereby the compressively stressed surface layer of the glass is broken, fracturing of the monolithic glass propagates throughout the bottle as symbolically indicated by the hatching F in FIG. 2G, and the monolithic glass bottle thereupon breaks into many small, almost regularly-shaped pieces of glass having no sharp edges. These blunt-edged glass granules fall past the transverse members 62 of the retainer cage onto the pile 64.

A succession of bottles (not shown) may be stacked in the chute 61, one over the other, so that as each bottle is granulated at the crushing station in the manner described, the immediately succeeding bottle is no longer supported above the station and drops into place at the station, causing the crushing nose 63 and associated lever to move back to their dashed line position, whereupon the cycle of granulating a bottle can be repeated.

Again, the pile 64 may be contained in suitable bins or the like (not shown) for ready collection and disposition without further treatment.

Again, like the plates 30, the toughening procedure for the bottles 60 may be modified to give granules of glass of various sizes (including both relatively tiny granules and relatively large smooth-edged chunks of glass) when the bottles 60 are granulated. Such variation and/or workpiece shape may also be utilized to give the bottles a degree of direction-sensitivity to impact blows, so that the bottles will more readily granulate when impacted from the side rather than from the top end by a blow of given intensity. Such direction-sensitivity helps assure that the mechanical stresses that the bottle experiences during filling and capping are less than or different than those imposed by initiator impacts or forces, so that the bottles remain intact. Thus, even though the bottles 60 are granulable, they can tolerate impacts which they may receive during filling and closing operations, such as application of caps. (Similarly, the consumer can reclose or recap the bottle for storage if the contents are only partly used.)

Again, where there is no concern whether particle sizes are or are not uniform, manufacturing tolerances can be correspondingly relaxed. Again, in many circumstances, there may be no great disadvantage if there is considerable variance in particle size when a given bottle 60 is granulated, or considerable variance in particle size from bottle to bottle when a number of bottles are granulated.

The invention is not to be limited to details of the above disclosure, which are given by way of example and not by way of limitation. Many changes and additions are possible. For example, the glass of the plates 30 or bottles 60 may be chemically tempered according to known techniques, rather than thermally tempered. Granulable cups, bowls, jars or the like may be formed, in addition to bottles and plates. Although, as previously stated, the invention is applicable to use for liquid and solids containment and consumer service in the soft drink, beer, wine, packaged foods, and fast food industries, it is also suited for use in containment and dispensing of pharmaceuticals, and cosmetics.

What is claimed is:

1. A method of packaging liquid in glass bottles comprising the steps of forming bottles of molten glass, then cooling said glass while internally stressing it, as by tempering, to a condition wherein, when cooled and then later impacted or crushed, it crumbles into blunt granules of glass, filling the bottles with the liquid to be packaged, capping the bottles, employing the bottles to store the liquid, opening the bottles and emptying the liquid therefrom, and then granulating the bottles by impacting or crushing to provide compact waste suitable for recycling or substantially non-contaminating landfill or dumping at sea.

* * * * *